Aug. 17, 1943.  L. D. HAGENBOOK  2,327,305
SHAKER CONVEYER
Filed June 7, 1941  3 Sheets-Sheet 1

INVENTOR
Loy D. Hagenbook
BY
Clarence F. Poole
ATTORNEY

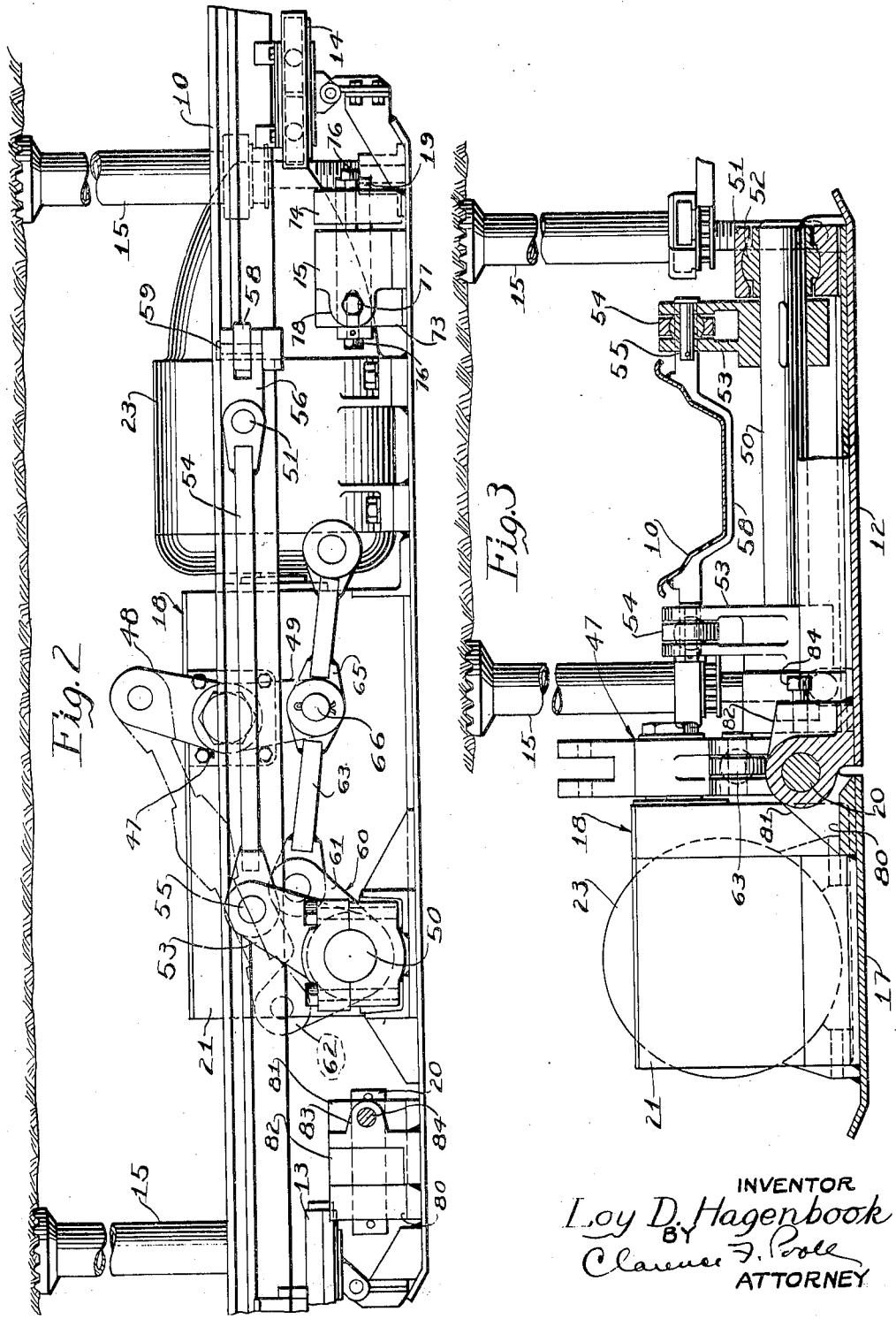

Aug. 17, 1943.  L. D. HAGENBOOK  2,327,305
SHAKER CONVEYER
Filed June 7, 1941   3 Sheets-Sheet 3
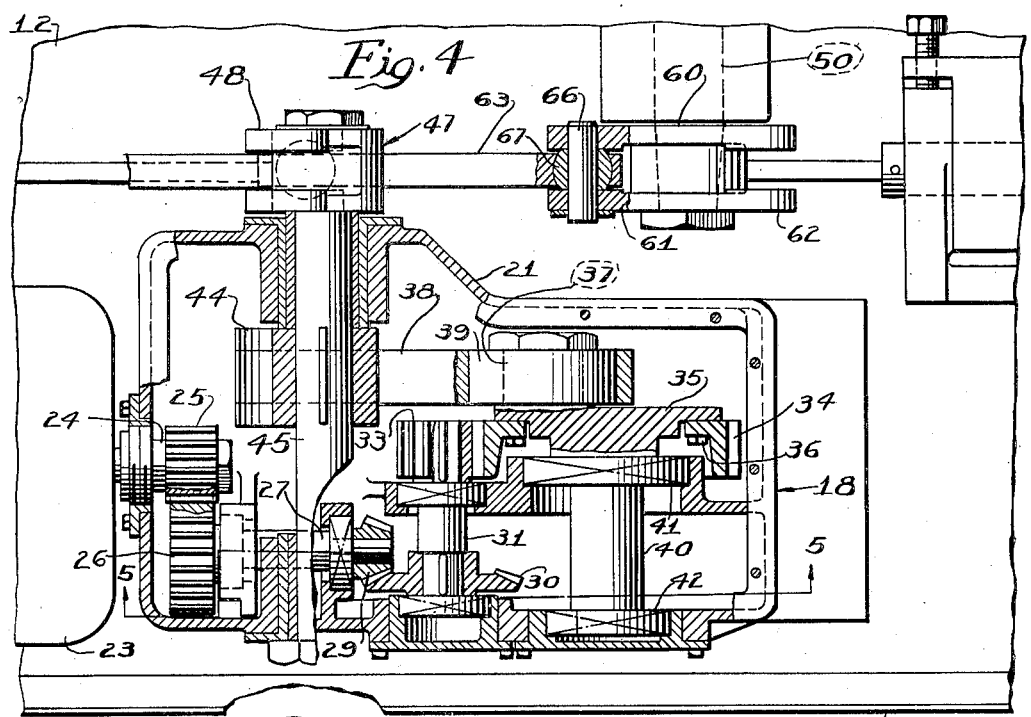
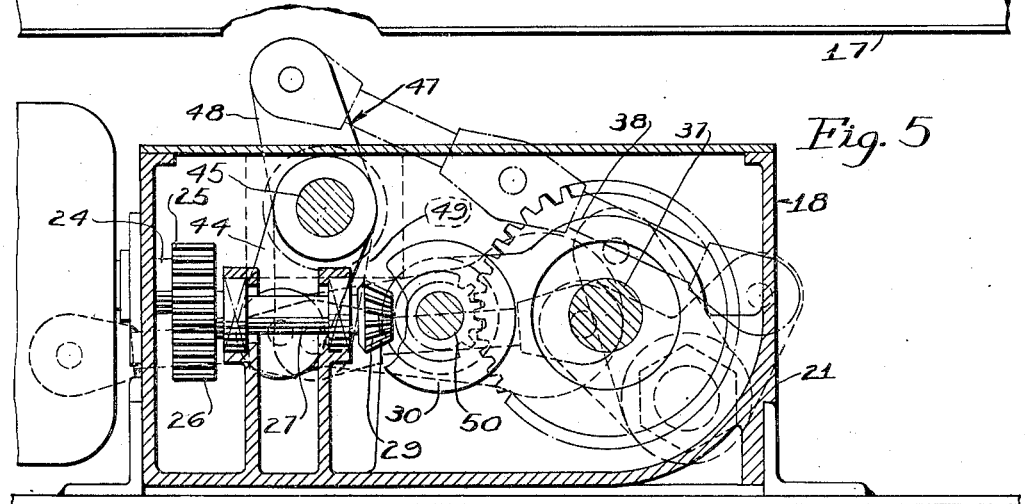
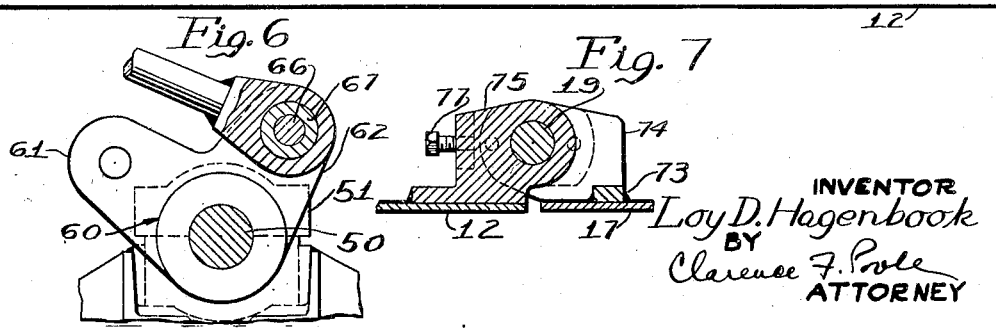
INVENTOR
Loy D. Hagenbook
BY
Clarence F. Poole
ATTORNEY Patented Aug. 17, 1943

2,327,305

UNITED STATES PATENT OFFICE 2,327,305

SHAKER CONVEYER

Loy D. Hagenbook, Chicago, Ill., assignor to Goodman Manufacturing Company, Chicago, Ill., a corporation of Illinois Application June 7, 1941, Serial No. 397,021

11 Claims. (Cl. 198—220)

This invention relates to improvements in shaker conveyers, and more particularly relates to an improved mounting for a shaker conveyer drive mechanism whereby the trough line may extend along one side of the drive mechanism.

The principal objects of the invention are to provide an improved drive mounting for a shaker conveyer trough line arranged for supporting the trough line to extend along one side of the drive mechanism and adapted to hold the drive mechanism in floating engagement with the ground.

A more specific object of my invention is to provide a drive mounting for a driving trough section of a shaker conveyer trough line, which mounting is secured to the ground and has a trough section of a shaker conveyer reciprocably mounted thereon, and to provide a base pivotally connected to said drive mounting for movement about an axis parallel to the longitudinal axis of the trough line and forming a mounting for the mechanism, for reciprocably driving the trough section, together with a drive link extending along the axis of pivotal connection of the drive mechanism to the drive mounting and arranged in parallel relation with respect thereto.

A still further object of my invention is to provide a shaker conveyer drive mechanism for reciprocably driving a shaker conveyer trough line, which is so arranged that the conveying effect of the trough line and drive mechanism may be reversed by a simple rearrangement of parts outside of the drive casing, so material may readily be conveyed along the trough line in either direction.

The device of my present invention is somewhat similar to that shown and described by application Serial No. 360,139, filed October 7, 1940, by William W. Sloane, but differs therefrom in that a part of the conveying action is effected by the rocking means on the fixed base plate and in that the fixed base plate and drive mechanism are arranged in side by side relationship.

Other objects of my invention will appear from time to time as the following specification proceeds and with reference to the accompanying drawings wherein:

Figure 2 is a view in side elevation of the device shown in Figure 1;

Figure 3 is a transverse sectional view of the drive mechanism;

Figure 4 is an enlarged plan view of the drive mechanism, with the top cover removed and with certain parts broken away and certain other parts shown in horizontal section;

Figure 5 is a sectional view taken substantially along line 5—5 of Figure 4;

Figure 1:
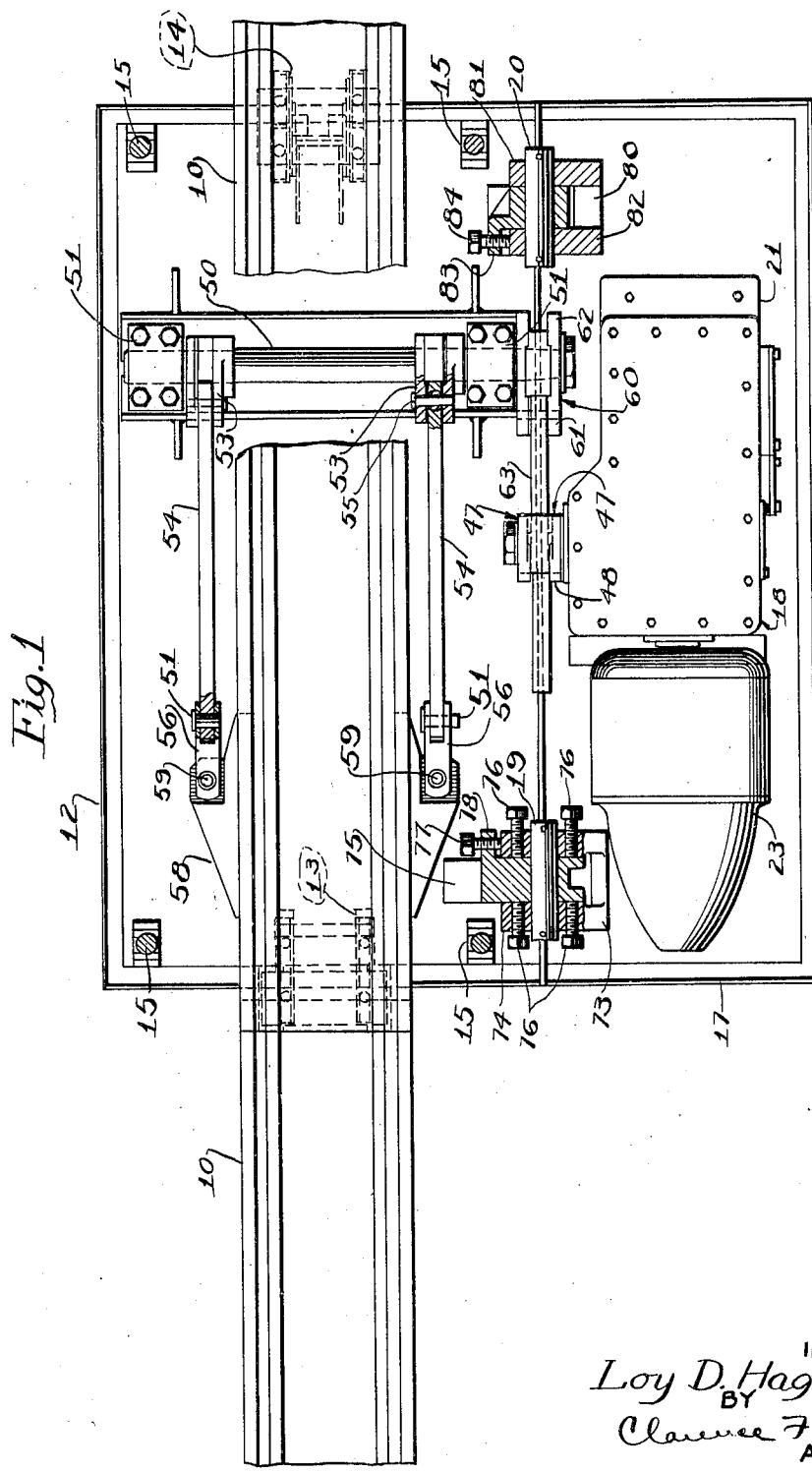
Figure 1 is a top plan view of a drive mounting for the trough line constructed in accordance with my invention.

Figure 6 is an enlarged detail view showing certain details of the drive connection to the rocking means, for reciprocably driving the shaker conveyer trough line; and Figure 7 is an enlarged detail view, with certain parts shown in section, showing certain details of the hinged connection between the base of the drive mechanism and the base of the drive mounting for a trough of the shaker conveyer trough line.

In the drawings the embodiment of my invention illustrated includes generally a trough section 10 of a shaker conveyer trough line, mounted on a base plate 12 on ball frames 13 and 14, pivoted to said base plate for movement about axes extending transversely of said trough section. Said base plate is adapted to be held in position on the ground by means of jacks 15, 15, mounted at each corner thereof and interposed between said base plate and the mine roof.

A base plate 17 for a shaker conveyer drive mechanism 18 extends along the base plate 12 and is pivotally connected thereto, for pivotal movement about an axis extending longitudinally of the trough section 10, by means of longitudinally spaced hinge pins 19 and 20. The hinged connection between said base plates will be more fully described as this specification proceeds.

The drive mechanism 18 is mounted in a frame and housing 21 mounted on the base plate 17, which housing provides bearing support means for the mechanism for transferring the rotary motion of a motor 23, mounted on said base plate, to a reciprocating motion such as will reciprocably move the trough section 10 in such a manner as to move material therealong in one direction.

The motor 23 is provided with a motor shaft 24, extending within the housing 21 which has an armature pinion 25 mounted on the end thereof. Said armature pinion meshes with and drives a spur gear 26 on a longitudinally extending shaft 27. A bevel pinion 29 is keyed on the forward end of said shaft and meshes with and drives a bevel gear 30 on a transversely extending shaft 31. A spur gear 33 is herein shown as being keyed on the inner end of said transverse shaft and meshes with and drives a spur gear 34. Said spur gear, as herein shown, is secured to the inner side of a crank 35 by means of a plurality of cap screws 36, 36 (see Figure 4). Said crank is provided with a crank pin 37 adapted to have a link 38 journaled thereon on a ball bearing 39, and is provided with an integrally formed shaft 40, mounted in said frame and housing on ball bearings 41 and 42.

The link 38 has pivotal connection at its end opposite from the crank pin 37 with a rocking member 44 mounted on a transversely extending rock shaft 45, journaled in opposite side walls of the frame and housing 21 and projecting outwardly from one side wall thereof. A rocking member 47 is secured to the outer end of said shaft and, as herein shown, is disposed just above the axis of pivotal connection of the base plate 12 to the base plate 17. Said rocking member is provided with an arm 48 projecting upwardly from said transverse shaft and with another arm 49 projecting downwardly from said transverse shaft. The purpose of this construction is to provide an arrangement whereby either rocking arm may be used to drive the trough section 10, so material may be conveyed along said trough section in reverse directions by using one or the other of said rocking arms.

A rock shaft 50 extends transversely of the trough section 10 and is mounted on the base plate 12 on bearing support members 51, 51. Bearing members 52, 52, forming bearings for said shaft, are mounted within said bearing support member. Said bearing members have outer convex faces, to permit said bearings to align themselves upon misalignment of said shaft. A pair of rocking arms 53, 53 are mounted on said rock shaft, just inside of the bearing support members 51, 51, and project upwardly therefrom. Said rocking arms are herein shown as being of a bifurcated formation and are pivotally connected to the free ends of drive arms 54, 54, by means of pivotal pins 55, 55. Said drive arms are transversely pivoted at their ends opposite from said rocking arms, to connecting members 56, 56, by pivotal pins 57, 57, and said connecting members are vertically pivotally connected to opposite sides of a drive member 58 by means of pivotal pins 59, 59. Said drive member extends beneath and laterally beyond opposite sides of said trough section.

The rock shaft 50 extends outwardly beyond the bearing support 51, adjacent the base plate 17, and beyond said base plate and has a rocking member 60 keyed to its overhanging end. Said rocking member is provided with an arm 61 and another arm 62. The arm 61 may be pivotally connected with the arm 49 by means of a connecting link 63, while the arm 62 may be connected with the arm 48 by means of said connecting link, for causing the conveying motion of said trough line to be reversed.

The connecting link 63, as herein shown, is apertured at its ends for pivotal connection to the rocking arms 62 and 48, and is also provided with an enlarged apertured portion 65, intermediate its ends, for connection to the rocking arm 49, when it is desired that the direction of movement of material along the trough line be reversed. Said connecting link is likewise so arranged that its longitudinal center line is directly above and in alignment with the axis of pivotal connection of the base plate 17 to the base plate 12.

The connection from either of the rocking arms 48 or 49 to said connecting link, and the connection of said connecting link to either of the rocking arms 61 or 62, includes a pin 66 extending through the furcations of either of said rocking arms and a ball-shaped bearing member 67, adapted to engage a concave shaped bearing surface formed in the apertured connecting portion of said connecting link (see Figures 4 and 6).

It should here be noted that the rocking arm 48 is rocked by the rocking shaft 45 to produce a conveying effect and that the rocking arm 62 likewise is so arranged with respect to the rocking arm 48 and rocking arms 53, 53, as to produce a conveying effect independent of the conveying effect produced by the rocking arm 48, so that the conveying effects of both rocking arms will be added to each other when connected together by the connecting link 63, in a manner clearly shown and described in Reissue Patent No. 21,313, the original of which issued to William W. Sloane on December 31, 1935. In a similar manner, the rocking arm 49 is rocked by the rocking shaft 45, to produce a conveying effect, but in a different phase from the rocking arm 48. The rocking arm 61 is likewise arranged to produce a conveying effect independently of the rocking arm 49 but in a different phase from the rocking arm 62. Thus when the rocking arm 49 is connected to the rocking arm 62, the conveying effects of said rocking arms will be added to each other and the phase or peak of the acceleration curve of said rocking arms will be advanced 90° out of phase from the peak of the acceleration curve of the rocking arms 48 and 62, to cause reversal in the conveying effect of the trough section 10.

It should also be noted that a part of the conveying effect of the drive mechanism is obtained outside of the housing 21 and by mechanism on the base plate 12, which is separate from the base plate 17.

Referring now in particular to the hinged connection between the base plate 12 and the base plate 17, a hinge member 73 is mounted on the base plate 17, adjacent one end thereof. Said hinge member has a bifurcated portion 74 extending over the plate 12. A hinge member 75 is mounted on the base plate 12 and extends between the bifurcated portion of the hinge member 73. The hinge pin 19 is adapted to extend through said hinge members and is arranged parallel to and in alignment with the extended longitudinal axis of the connecting link 63. Machine screws 76, 76 are threaded in the furcations of said hinge member, to positively engage one side or the other of the hinge member 75 with one or the other furcation of said hinge member 73, depending upon the direction of the conveying action of the drive mechanism. The purpose of said screws is to take up play between said hinge members and to prevent pounding between said hinge members, during reciprocation of the conveyer.

A machine screw 77 is threaded in a lug 78, projecting from the hinge member 75, and is adapted to engage one of the furcations of the hinge member 73, to take up play between said hinge pin 19 and said hinge member.

A hinge member 80, having a bifurcated portion 81, is mounted on the base plate 17 on the end thereof opposite from the hinge member 73. A hinge member 82 mounted on the base 12 extends between the furcations of said hinge member 80. Said hinge members are pivotally connected together by the hinge pin 20, which is arranged coaxial with the hinge pin 19.

The hinge member 82 is provided with an inwardly projecting lug 83 having a cap screw 84 threaded therein and adapted to engage one of the furcations of the hinge member 80, to take up any play between the hinge pin 20 and said hinge member.

It may be seen from the foregoing that a simplified drive mounting for a shaker conveyer trough line has been provided, permitting the trough line to be positioned at one side of the drive mechanism, which is so arranged that the drive mechanism has floating engagement with the ground.

It may further be seen that a part of the conveying action is attained by rocking means mounted on the mounting for the trough line and that this trough and drive mounting provides a simplified side drive arrangement for a shaker conveyer trough line, which decreases the stresses on the drive mechanism and reciprocating parts thereof and permits a certain freedom of motion of the drive mechanism with respect to the fixed base and trough line and permits the direction of movement of material along the trough line to be reversed, by a simple re-arrangement of the connecting link 63 with respect to its associated rocking arms, which link and arms are located outside of the drive casing.

While I have herein shown and described one form in which may invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a drive mechanism for shaker conveyers, a base adapted to be held in position on the ground during reciprocation of the conveyer, a rocking member mounted on said base and having drive connection with a trough section of a shaker conveyer trough line, means disposed to one side of said base for rockably driving said rocking member including a second base separate from said first mentioned base and extending therealong, a motor on said second base, means driven by said motor for converting the rotary motion thereof to reciprocating motion including a crank and a rocking shaft rocked thereby, and having operative connection with said rocking member, and a pivotal connection between said second base and said first mentioned base, the axis of which extends longitudinally of said trough section, for holding said second base in position, but permitting it to floatingly engage the ground during operation of the conveyer.

2. A shaker conveyer drive mechanism including a base adapted to be held in position on the ground, a rocking member transversely pivoted on said base, a conveyer trough section extending along said base and mounted for reciprocable movement with respect thereto, a drive connection from said rocking member to said trough section for reciprocably driving said trough section, another base separate from said first mentioned base and adapted to have floating engagement with the ground, a motor on said base, a crank rotatably driven by said motor, a rocking member rockably driven by said crank, a link connecting said rocking member with said rocking member on said fixed base, and a pivotal connection between said bases, for pivotally connecting said bases together for limited movement about an axis parallel to the longitudinal axis of said link.

3. A shaker conveyer drive mechanism including a base adapted to be held in position on the ground, a rocking member transversely pivoted on said base, a conveyer trough section extending along said base and mounted for reciprocable movement with respect thereto, a drive connection from said rocking member to said trough section, for reciprocably driving said trough section, another base separate from said first mentioned base, a pivotal connection between said bases, for holding said second mentioned base in position during reciprocation of the conveyer, but permitting said second mentioned base to have floating engagement with the ground, a motor on said second mentioned base, a crank rotatably driven thereby, a rocking member rockably driven by said crank, and a link connecting said crank with said rocking member, the longitudinal axis of said link being parallel to the pivotal axis of said pivotal connection.

4. A shaker conveyer drive mechanism including a base adapted to be held in position on the ground, a rocking member transversely pivoted on said base, a conveyer trough section extending along said base and mounted for reciprocable movement with respect thereto, a drive connection from said rocking member to said trough section, for reciprocably driving said trough section, another base separate from said first mentioned base, a pivotal connection between said bases, for holding said second mentioned base in position during reciprocation of the conveyer, but permitting said second mentioned base to have floating engagement with the ground, a motor on said second mentioned base, a crank rotatably driven thereby, a rocking member rockably driven by said crank, and a link connecting said crank with said rocking member, the longitudinal axis of said link being parallel to the pivotal axis of said pivotal connection, and intersecting a vertical plane extending through the pivotal axis of said pivotal connection.

5. In a shaker conveyer drive mechanism, a base adapted to be held in position on the ground during operation of the conveyer, a rocking member transversely pivoted on said base, a conveyer trough section mounted on said base for reciprocable movement with respect thereto, a drive connection from said rocking member to said trough section, and mechanism extending along the side of said trough section for rocking said rocking member and reciprocably driving said trough section including a motor, means driven by said motor for converting the rotary motion thereof into reciprocating motion, a drive connection between said means and said rocking member, and a pivotal connection between said mechanism and base, permitting floating movement thereof about an axis parallel to the longitudinal axis of said trough section.

6. In a shaker conveyer drive mechanism, a base adapted to be held in position on the ground during operation of the conveyer, a rocking member transversely pivoted on said base, a conveyer trough section mounted on said base for reciprocable movement with respect thereto, a drive connection from said rocking member to said trough section, and mechanism extending along the side of said trough section for rocking said rocking member and reciprocably driving said trough section including a motor, means driven by said motor for converting the rotary motion thereof into reciprocating motion, a drive connection between said means and said rocking member, a pivotal connection between said mechanism and base, permitting floating movement thereof about an axis parallel to the longitudinal axis of said trough section, and said drive connection including a link connecting said drive mechanism to said rocking member and arranged parallel to the axis of connection of said drive mechanism to said base and intersecting a vertical plane extending through the axis of pivotal connection of said drive mechanism to said base.

7. In a shaker conveyer drive mechanism, a base adapted to be held in position on the ground during operation of the conveyer, a rocking member transversely pivoted on said base, a conveyer trough section mounted on said base for reciprocable movement with respect thereto, a drive connection from said rocking member to said trough section, and mechanism extending along the side of said trough section for rocking said rocking member and reciprocably driving said trough section including a casing, a motor, means driven by said motor and mounted within said casing, for converting the rotary motion thereof into reciprocating motion, a rocking arm mounted outside of said casing and rockably driven by said means within said casing, a link connecting said rocking arm with said rocking member on said base, and a pivotal connection between said casing and base intersected by a plane extending through the longitudinal axis of said link.

8. In a shaker conveyer drive mechanism, a base adapted to be held in position on the ground during operation of the conveyer, a rocking member transversely pivoted on said base, a conveyer trough section mounted on said base for reciprocable movement with respect thereto, a drive connection from said rocking member to said trough section, and mechanism extending along the side of said trough section for rocking said rocking member and reciprocably driving said trough section including a casing, a motor, means driven by said motor and mounted within said casing, for converting the rotary motion thereof into reciprocating motion, a rocking arm mounted outside of said casing and rockably driven by means within said casing, a pivotal connection between said casing and base to permit floating movement of said casing with respect to said base about an axis extending longitudinally of said trough section, a link having its longitudinal axis parallel to the axis of the hinged connection between said casing and base, and pivotally connected between said rocking arm and member, the connections between said link and said rocking arm and rocking member being such as to permit said link to pivotally move with respect to said arm and member about perpendicular axes.

9. In a shaker conveyer drive mechanism, a base adapted to be held in position on the ground during operation of the conveyer, a rocking member transversely pivoted on said base, a conveyer trough section mounted on said base for reciprocable movement with respect thereto, a drive connection from said rocking member to said trough section, and mechanism extending along the side of said trough section for rocking said rocking member and reciprocably driving said trough section including a casing, a motor, means driven by said motor and mounted within said casing, for converting the rotary motion thereof into reciprocating motion, a rocking arm outside of said casing and rockably driven by means within said casing, a pivotal connection between said casing and base to permit floating movement of said casing with respect to said base about an axis extending longitudinally of said trough section, a link pivotally connected between said rocking arm and rocking member, the connection between said link and rocking arm and member being such as to permit said link to pivotally move with respect to said arm and member about perpendicular axes, and the longitudinal axis of said link being parallel to the longitudinal axis of said trough section and coinciding with a plane extending through the pivotal axis of said hinged connection.

10. In a shaker conveyer drive mechanism, a rocking member, a drive connection from said rocking member to a conveyer trough section, for reciprocably driving said trough section, another rocking member, mechanism for reciprocably driving said rocking member, each of said rocking members having a pair of rocking arms, and an operative connection between certain of said arms of said rocking members for driving said second mentioned rocking member from said first mentioned rocking member in such a manner as to cause movement of material along said trough section in one direction, or between certain other of said rocking arms of said rocking members, for driving said second mentioned rocking member from said first mentioned rocking member in such a manner as to cause movement of material along said trough section in a reverse direction.

11. In a shaker conveyer drive mechanism, a rocking member, a drive connection from said rocking member to a conveyer trough section, for reciprocably driving said trough section, another rocking member, mechanism for reciprocably driving said rocking member, each of said rocking members having a pair of rocking arms, a link adapted to be connected between one rocking arm of one rocking member and one rocking arm of said other rocking member for rocking said other rocking member in such a manner as to cause material to move along said trough section in one direction, said link also being adapted to be connected between said other rocking arm of said first mentioned rocking member and said other rocking arm of said other rocking member for driving said second mentioned rocking member in such a manner as to reverse the conveying action of said trough section.

LOY D. HAGENBOOK.